US008090453B1

(12) United States Patent
Harwood

(10) Patent No.: US 8,090,453 B1
(45) Date of Patent: Jan. 3, 2012

(54) METHOD AND SYSTEM OF CONTROLLING MEDIA DEVICES CONFIGURED TO OUTPUT SIGNALS TO SURROUNDING AREA

(76) Inventor: Ronald Paul Harwood, Farmington Hills, MI (US)

( * ) Notice: Subject to any disclaimer, the term of this patent is extended or adjusted under 35 U.S.C. 154(b) by 79 days.

(21) Appl. No.: 12/628,746

(22) Filed: Dec. 1, 2009

Related U.S. Application Data

(63) Continuation-in-part of application No. 11/209,890, filed on Aug. 23, 2005, now Pat. No. 7,630,776.

(51) Int. Cl.
*G05B 11/01* (2006.01)
*G05F 1/00* (2006.01)

(52) U.S. Cl. .......................................... 700/19; 315/291

(58) Field of Classification Search .................... 700/19; 315/291

See application file for complete search history.

(56) References Cited

U.S. PATENT DOCUMENTS 4,329,625 A * 5/1982 Nishizawa et al. ........... 315/158
4,716,344 A 12/1987 Newell et al.
4,972,310 A * 11/1990 Onodera et al. ................ 700/19
5,920,634 A 7/1999 Chiquette
6,097,549 A * 8/2000 Jenkins et al. ................ 359/726
6,166,496 A 12/2000 Lys et al.
6,188,933 B1 2/2001 Hewlett et al.
6,331,756 B1 12/2001 Belliveau
6,398,988 B1 * 6/2002 Jenkins et al. ................. 264/2.2
6,459,217 B1 10/2002 Belliveau
6,459,919 B1 10/2002 Lys et al.
6,480,578 B1 11/2002 Allport
6,605,907 B2 8/2003 Belliveau
6,622,053 B1 9/2003 Hewlett et al.
6,791,284 B1 9/2004 Levy
6,829,033 B2 12/2004 Hose et al.
6,859,644 B2 2/2005 Wang
6,953,262 B2 * 10/2005 Cleaver et al. ................ 362/219
7,167,103 B2 1/2007 Warren et al.
7,188,970 B2 * 3/2007 Cleaver et al. ................ 362/219
7,257,644 B2 8/2007 Simonnet et al.
7,363,209 B2 4/2008 Kuschel et al.
7,425,798 B2 * 9/2008 St.-Germain ................. 315/129
7,522,876 B1 4/2009 Meitzen et al.
7,888,881 B2 * 2/2011 Shteynberg et al. .......... 315/291
2001/0047212 A1 11/2001 Hewlett et al.
2002/0047628 A1 4/2002 Morgan et al.
2002/0047648 A1 4/2002 Belliveau
2002/0048169 A1 4/2002 Dowling et al.
2002/0070688 A1 6/2002 Dowling et al.
2002/0078221 A1 6/2002 Blackwell et al.
2002/0093296 A1 7/2002 Belliveau
2002/0153851 A1 10/2002 Morgan et al.
2002/0163316 A1 11/2002 Lys et al.
2002/0171377 A1 11/2002 Mueller et al.
2002/0171378 A1 11/2002 Morgan et al.
2003/0001523 A1 1/2003 Belliveau
2003/0015973 A1 * 1/2003 Ovens et al. .................. 315/291
2003/0055689 A1 3/2003 Block et al.
2003/0137258 A1 7/2003 Piepgras et al.

(Continued)

*Primary Examiner* — Ramesh Patel
*Assistant Examiner* — Thomas Stevens
(74) *Attorney, Agent, or Firm* — Brooks Kushman P.C.

(57) ABSTRACT

A system of controlling media devices configured for outputting signals to a surrounding area. The system including a control strategy for controlling operation of the media devices to execute operations according to a common schedule and a communications strategy for use in communicating the control strategy between the media devices in such a manner as to facilitate distribution of the control strategy to the media devices desired to operate according to the common timeline.

19 Claims, 4 Drawing Sheets

U.S. PATENT DOCUMENTS

2003/0151909 A1 8/2003 Sid
2003/0206411 A9 11/2003 Dowling et al.
2003/0208291 A1 11/2003 Belliveau
2003/0210222 A1* 11/2003 Ogiwara et al. .............. 345/103
2003/0214259 A9 11/2003 Dowling et al.
2003/0222587 A1 12/2003 Dowling, Jr. et al.
2004/0017164 A1 1/2004 Belliveau
2004/0036006 A1 2/2004 Dowling
2004/0052076 A1 3/2004 Mueller et al.
2004/0141321 A1 7/2004 Dowling et al.
2004/0160198 A1 8/2004 Hewlett et al.
2004/0160199 A1 8/2004 Morgan et al.
2005/0029967 A1 2/2005 Chen et al.
2005/0035717 A1 2/2005 Adamson et al.
2005/0035730 A1 2/2005 Blum
2005/0047134 A1 3/2005 Mueller et al.
2005/0082989 A1* 4/2005 Jones et al. ................... 315/194
2005/0101314 A1 5/2005 Levi
2005/0103938 A1* 5/2005 Butsch et al. ................. 244/130
2005/0116662 A1 6/2005 Sanchez
2005/0116667 A1* 6/2005 Mueller et al. ................ 315/312
2005/0250440 A1 11/2005 Zhou et al.
2006/0092043 A1 5/2006 Lagassey
2007/0079012 A1 4/2007 Walker
2007/0096895 A1 5/2007 Sneade, Jr.
2007/0291483 A1 12/2007 Lys

* cited by examiner

METHOD AND SYSTEM OF CONTROLLING MEDIA DEVICES CONFIGURED TO OUTPUT SIGNALS TO SURROUNDING AREA

CROSS-REFERENCE TO RELATED APPLICATIONS

This application is a continuation-in-part of U.S. application Ser. No. 11/209,890 filed Aug. 23, 2005.

BACKGROUND OF THE INVENTION

1. Field of the Invention

The present invention relates to methods and systems of controlling media devices configured to output signals to a surrounding area.

2. Background Art

Media devices may be configured to output signals to a surrounding area. The surrounding area may be generally characterized as an ambient environment proximate the media devices from which an occupant may receive the outputted signals. For example, the media devices may be audio type devices configured to emit audio signals, a lighting type device configured to emit lighting signals, a video type device configured to emit lighting and video signals, and/or any other type of device having a suitable configuration.

One problem faced with such media devices relates to controlling the operation thereof. In particular, it may be difficult to coordinate action of multiple media devices to operate according to a common schedule or plan. It may also be difficult to program the operation of the media devices after the media devices are manufactured and deployed in a network.

SUMMARY OF THE INVENTION

One non-limiting aspect of the present invention relates to overcoming the above-identified deficiencies by providing a means for coordinating action of multiple media devices and/or by easing programming of media devices after deployment in a network One non-limiting aspect of the present invention relates to a system of controlling media devices configured for outputting signals to a surrounding area. The system may include a control strategy for controlling operation of the media devices, a communications strategy for coordinating communication between the media devices, and a source configured to distribute the control strategy and the communications strategy to at least one of the media devices. The communications strategy may be configured to specify communication of the control strategy from at least one of the media devices to another of the media devices.

One non-limiting aspect of the present invention relates to a system of controlling media devices configured for outputting signals to a surrounding area. The system may include a control strategy for controlling operation of the media devices to execute operations according to a common schedule and a communications strategy for use in communicating the control strategy between the media devices in such a manner as to facilitate distribution of the control strategy to the media devices desired to operate according to the common timeline.

One non-limiting aspect of the present invention relates to a method of controlling media devices. The method may include configuring the media devices to output signals to a surrounding area according to instructions included within a control strategy and electronically distributing the control strategy to the media devices through a network communication medium.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description and the accompany drawings in which:

DETAILED DESCRIPTION OF THE PREFERRED EMBODIMENT(S)

Figure 1:
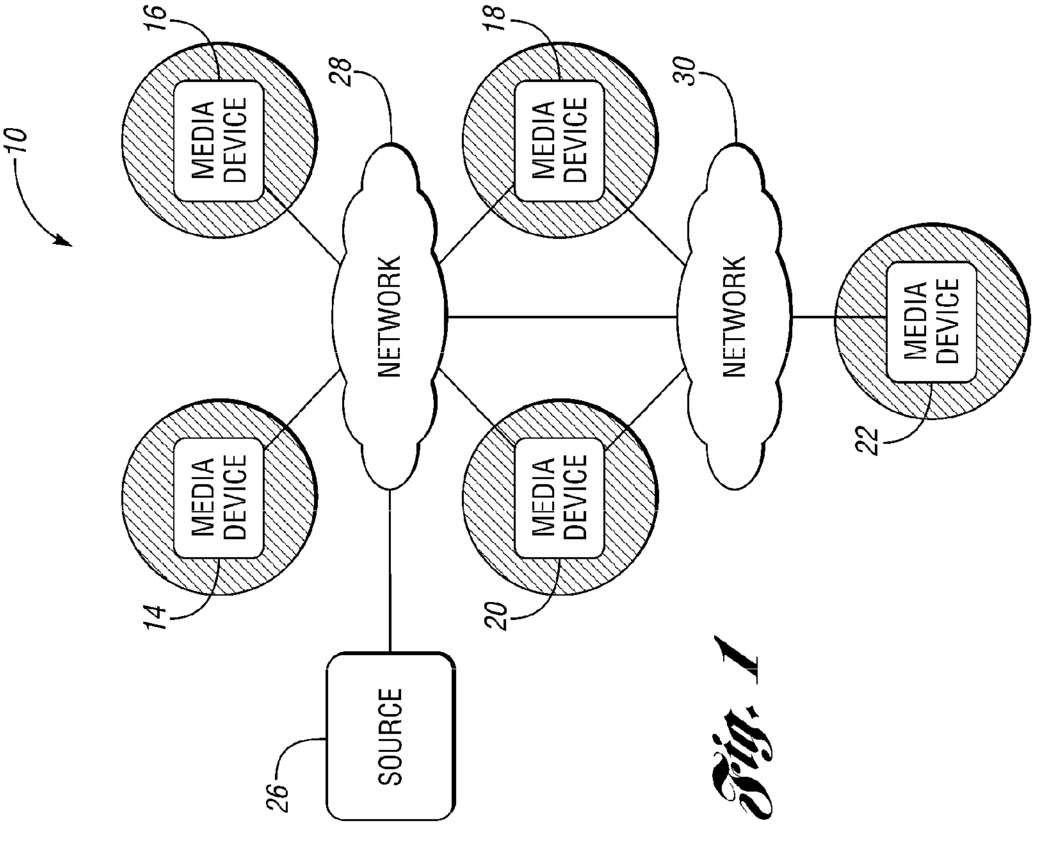
FIG. 1 illustrates a system in accordance with one non-limiting aspect of the present invention.

FIG. 1 illustrates a system 10 in accordance with one non-limiting aspect of the present invention. The system 10 may include a number of media devices 14-22 configured to emit signals to a surrounding area (shown with shading). A source 26 may be included for providing instructions and other signals to the media devices 14-22 over one or more networks 28-30.

The networks 28-30 may be wireline and/or wireless networks suitable for facilitating communications between the source 26 and media devices 14-22. The source 26 and media devices 14-22 may include features to facilitate communications with the networks 28-30. In particular, the source 26 and media devices 14-22 may include wireless features for facilitating wireless communications between each other. Optionally, more than one network 28-30 may be used to communication with some of the media devices 14-22, such as in a network mesh environment.

The media devices 14-22 may be generally characterized as any unit capable of emitting audio, visual, and/or audio-visual (video) signals to the surrounding areas. The media devices 14-22 may include memories, processors, communication interfaces, and other features to facilitate the operation thereof. The media devices 14-22 may be located in close proximity to each other and/or distributed over distant geographical areas.

One or more of the media devices 14-22 may be a lighting fixture. The lighting fixture may be configured to emit light and/or other visual signals to the surrounding area. The lighting fixtures may be controlled to perform any number of operations, including operations associated with theatrical lighting maneuvers. The lighting fixtures may be configured controlled according to any number of standards and protocols, including those specified in the DMX-512 protocol defined by the United States Institute for Theatre Technology, Inc. (USITT).

One or more of the media devices 14-22 may be an audio unit configured to emit audio signals to the surrounding area. The audio unit may include a memory or other feature for receiving and storing audio tracks. A playlist of other set of instructions may be provide to direct playback of the audio tracks to the surrounding area. Alternatively, the audio units may be configured to tune to particular buffered or real-time audio streams for broadcasting to the surrounding area. The audio unit may be a banner type speak unit, such as that specified in U.S. patent application Ser. No. 11/209,794, entitled Speaker Assembly For A Structural Pole And Method Of Mounting The Same, which is hereby incorporated in its entirety.

One or more of the media devices 14-22 may be a video unit configured to emit video signals to the surrounding area. The video unit may include a television screen or other display and an audio source to facilitate emitting audio-video signals to the surrounding area. The video unit may include a memory or other feature for storing video clips for subsequently playback to occupants in the surrounding area and/or otherwise configured for streaming video. Alternatively, the video units may be configured to tune to particular buffered or real-time video streams for broadcasting to the surrounding area. The video unit may be configured to receive video signals from a service provider or other entity.

The source 26 may be generally characterized as any unit capable of generating instructions for controlling operations of the media devices 14-22. The source 26 may include memories, processors, and other features for executing any number operations, including a communication feature to facilitate electronic communications with the media devices 14-22. The source 26 may be configured to receive and/or generate a control strategy for controlling operations of the media devices 14-22 and a communications strategy for controlling communications between the media devices 14-22 and source 26.

The source 26 may be a standalone feature having applications for use in controlling the media devices 14-22 and/or the source 26 itself may be a application, such as that run by a computer or other processing means, which may be executed by the computer for directly or indirectly controlling operation of the media devices 14-22. The source 26 may be a software program, logic, or other feature embodied in a computer readable medium or other suitable medium. The source 26, while shown as a feature separate from the media devices 14-22, may reside on one or more of the media devices 14-22 and need not be a separate feature.

The source 26 may be configured to receive or store a show schedule or other feature associated with formatting multiple operations of the media devices 14-22. The show schedule may include a timeline and corresponding operations to be executed at particular intervals or events. Queues, macros, and other features may be included within the show schedule to facilitate changing operations and other parameters associated with adjusting or otherwise varying operation of the media devices 14-22 to correspond with the show schedule.

The control strategy may be based on the show schedule or other set of events for controlling operations of one or more of the media devices 14-22. Multiple control strategies may be generated and distributed to the media devices 14-22 to control the operation thereof. In particular, if the system 10 includes different types of the media devices 14-22, multiple control strategies may be provided for each type of media device 14-22. Optionally, a common control strategy may be distributed to multiple media devices 14-22 to control the media devices 14-22 to cooperatively execute a number of operations according to a predefined schedule, such as to execute an audio, lighting, or video show where operations of multiple media devices 14-22 are coordinated according to a common schedule.

The communications strategy may be used to control communications between the media devices 14-22. The communications strategy may include features for coordinating delivery of the control strategy to other media devices 14-22. For example, the communications strategy may used to facilitate delivery of one or more control strategies to one or more media devices 14-22 so as to permit the media devices to be deployed in the system 10 without having the control strategy loaded prior to the deployment thereof and/or to facilitate distribution of changes to the control strategy without requiring the source 26 to directly communicate with each media device 14-22. The communications strategy may include instructions for transporting particular control strategies to media devices 14-22 associated therewith, such as to permit multiple control strategies to be transported to the same or different media devices 14-22.

The communications strategy may be used to control communications of newly added media devices with deployed media devices 14-22 and the source 26. The newly added media devices 14-22 may be configured to register or otherwise contact the deployed media devices 14-22 when attempting to enter the system 10. The deployed media devices 14-22 may consult the communication strategy and request information from the newly added media devices 14-22 to determine whether the newly added media devices 14-22 are to be added to the system 10. The other media devices 14-22 may authenticate or otherwise restrict access to the control strategy to media devices 14-22 meeting desired security parameters. The communications strategy may specify an authentication processes and other procedures for use in verify access to the control strategy. The approved media devices 14-22 may then be transferred the communications strategy to coordinate communications with other media devices in the system.

Once approved for addition to the system, the newly added media devices may retrieve one or more control strategies from the source 26 and/or other media devices 14-22 according to instruction included within the communications strategy. In this manner, the present invention is able to dynamically build an environment wherein media devices 14-22 may be freely added and controlled without requiring registration and authentication with the source 26 or other system administrators.

The source 26 may be configured to receive and/or generate a network integrity strategy. The network integrity strategy may be used to monitor the media devices 14-22 in the system 10 and to determine whether the monitored media devices 14-22 are operation according to the desired control strategy. The network integrity strategy may be configured to periodically poll the media devices 14-22 and to determine whether media devices 14-22 have been added or removed from the system 10.

Figure 2:
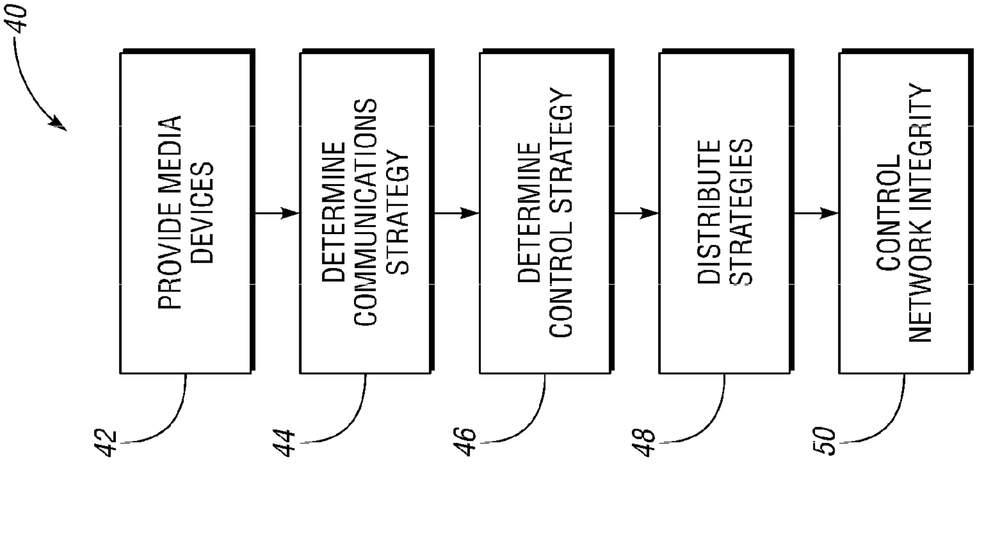
FIG. 2 illustrates a flowchart of a method for use in controlling the media devices in accordance with one non-limiting aspect of the present invention.

FIG. 2 illustrates a flowchart 40 of a method for use in controlling the media devices. The method associated with the flowchart 40 may be embodied in a computer readable medium, software application, or other logically functioning element to execute the operation described below. The method may be executed through operation of the source 26 and/or media devices 14-22 and require each such feature to be configured or otherwise suitably arranged to support the operations described below.

Block 44 relates to providing one or more of the media devices 14-22 into a desired arrangement. The media devices 14-22 may be arranged in a particular manner depending on the operations it may perform. For example, if one or more of the media devices 14-22 are lighting fixtures, the lighting fixtures may be arranged around a stage or otherwise grouped for providing lighting show. If the one or more of the media devices are banner speakers, the banner speakers may be arranged along a street, boardwalk, or other pedestrian area where it may be desirable to broadcast audio signals. If the media devices 14-22 are video units, the video units may be arranged in a viewing array or other arrangement to facilitate the viewing thereof. Any number or media devices 14-22 may be provided.

Block 44 relates to determining a communications strategy to define communications between the media devices 14-22 and the source 26. The communications strategy may define protocols and other features for controlling communications and insuring network integrity, as described below in more detail.

The communications strategy may be distributed from the source 26 to one or more of the media devices 14-22 and/or directly from one or more of the media devices 14-22, such as if one of the media devices 14-22 is pre-loaded with the communications strategy.

Block 46 relates to determining one or more control strategies to control operations of the media devices 14-22. The control strategy may include any number or parameters, rules, and features for each particular media device. Multiple control strategies may be provided for any number of media devices 14-22. The control strategy may be used to coordinate activities of the media devices 14-22 according to a common schedule or plan.

For example, if the media devices 14-22 are lighting fixtures, the control strategy may specify execution of particular operations at particular intervals so as to provide a lighting show. If the media devices 14-22 are banner speakers, the control strategy may specify playback of particular audio tracks are predefined intervals so as to provide audio messaging capabilities and/or the control strategy may control the banner speakers to tune to particular buffered or real-time audio streams for broadcasting. If the media devices 14-22 are video units, the control strategy may specify playback of stored video and/or tuning to buffered or real-time video streams for playback.

Block 48 relates to distributing the control and communications strategies to each media devices 14-22 in the system. The strategies may be distributed from the source 26 to one or more of the media devices 14-22 through an hopped, ad hoc, point-to-point, point-to-many, peer-to-peer, or other delivery process. In addition to or in place thereof, one or more of the media devices 14-22 may be configured to distribute the strategies directly to the other media devices 14-22, and thereby, eliminate the need to include the source 26 in the system.

One aspect of the present invention relates to the ability of the system 10 to dynamically support adding media devices 14-22 to the system 10. As such, distributing the strategies to the media devices 14-22 may include distributing the strategies to media devices 14-22 attempting to become part of the system 10. The media devices 14-22 attempting to become part of the system 10 may include basic or common communication features to facilitate communications with one or more of the media devices 14-22 and/or source 26.

The communications strategies already associated with the deployed media devices 14-22 may include features for controlling when the new media devices 14-22 should be added to the system. A registration strategy or other authentication process may be provided within the communication strategy to facilitate this determination. Information, identifying characteristics, and other data may be verified before permitting the new media device 14-22 to become part of the system 10. Once added, the control strategies appropriate to the new media device 14-22 may then be distributed thereto from one of the media devices 14-22 and/or source 26.

Block 50 relates to providing network integrity control strategy to facilitate verifying network integrity. The strategy may include instructions for ascertaining the number of media devices 14-22 operating in the system 10 and whether the operations thereof are being executed according to the parameters defined in the corresponding control and communication strategies. The source 26 and/or one or more of the media devices 14-22 may include the network integrity strategy and be configured to coordinate the operations associated therewith.

Figure 3:
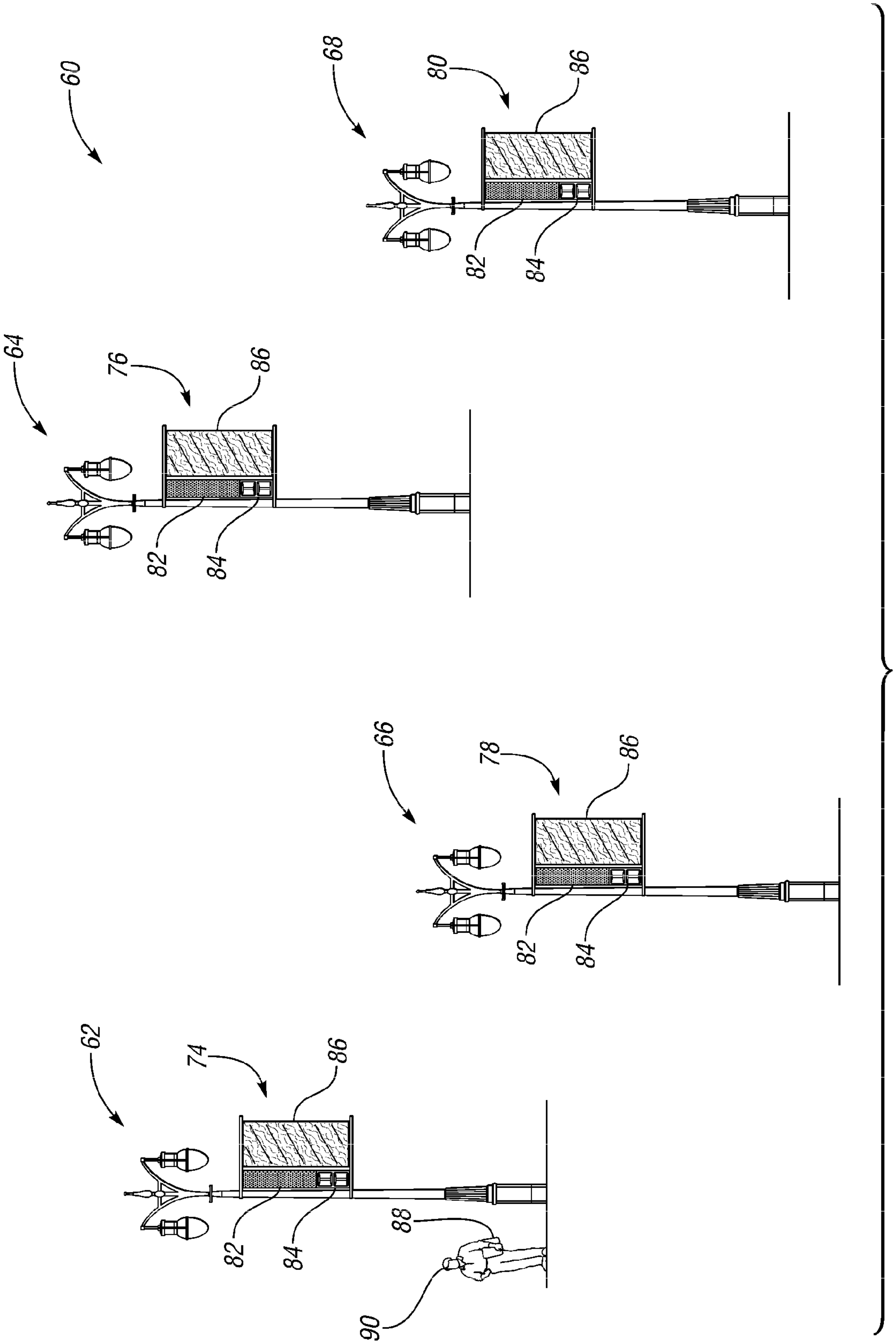
FIG. 3 illustrates a system for generating alerts at a number of geographically spaced apart light poles used to illuminate a thoroughfare, street, boardwalk, or other pedestrian area in accordance with one non-limiting aspect of the present invention

FIG. 3 illustrates a system 60 for generating alerts at a number of geographically spaced apart light poles 62, 64, 66, 68 used to illuminate a thoroughfare, street, boardwalk, or other pedestrian area. An alerting device 74, 76, 78, 80 is affixed to each of the light poles 62, 64, 66, 68. The alerting devices 74, 76, 78, 80 may be configured to output a message to a surrounding area depending on conditions sensed by the alerting devices 74, 76, 78, 80 for the surrounding area. The message may be a visual message issued from a display 82, an audible message issue from a speaker 84, illumination or other attention draw to a banner 86, etc.

A controller 88, such as that carried on a person 90 or otherwise positioned in proximity to one or more of the light poles 62, 64, 66, 68 may be configured to communicate a control strategy to the alerting devices 74, 76, 78, 80. The control strategy may specify the messages to be outputted from the alerting devices 74, 76, 78, 80 as a function of sensed conditions. The control strategy may require a first one of the alerting devices (e.g., device 74) to output a first one of the messages and to instruct at least a second one of the alerting devices (e.g. device 76) to output the first one of the messages if the second altering device 76 fails to sense the conditions that prompted the first alerting device 74 to output the first one of the messages.

The controller 88 may be configured to wirelessly communicate the control strategy to a first portion of the alerting devices (e.g. devices 74, 76, 78) within a communication range of the controller 88. A portion of the devices 24, 26, 28 receiving the control strategy may then relay it to one or more devices (e.g. device 80) that are beyond the communication range of the controller 88, i.e., through wireline or wireless communications. In this manner, a second portion of the first portion of the alerting 74, 76, 78, devices within the communication range of the controller 88 may be required to communicate the control strategy to a third portion of the alerting devices 80 beyond the communication range of the controller 88.

The present invention contemplates an intelligent multiplexed communication environment having distributed control, monitoring and reporting for use in audio, video and lighting systems. For example, a homeland security application may include playback units installed in light poles at regular intervals down a street. Once programmed and content delivered, the light pole may play the scripted content synchronized with other light poles. The only way a light pole could quit playing audio is if power fails. Battery backup and solar recharging systems could be installed at each light pole to support uninterrupted playback. Reliability may be further strengthened by the wireless connectivity of 900 feet, meaning that on average 5 directly adjacent light poles would have to fail before global scripting updates would be halted.

A mission critical digital signage application may offer stand-a-lone players updated by master scripts and content from a central FTP server. Playback logs are forwarded to the FTP server nightly so they may be utilized for billing purposes as verification that the content played. Optionally, distributed monitoring features, i.e., multiple controllers requesting status of the same player, may be included to monitor the players. The distribute monitoring features may be configured to send alerts immediately when players fail their diagnostics. With the ability to incorporate such monitoring features into the players, the present invention is able to utilize redundancy from the number of other players on the network and the player can be identified as beginning to fail or failed well in advance of it being noticed. Reliability is strengthened by not relying on one central monitoring system to perform the diagnostics.

A retail, architectural, themed and performance venue application may include lighting systems supported by a number of processors distributed to each lighting device. The processors may be use in conjunction with a software package that allows users the ability create custom light shows, and/or capture existing lighting shows from any DMX lighting console. The information may then uploaded to the hand size processors connected to the lighting devices. Lastly the software may also allow monitoring of the lighting device verifying that the data arrived at the fixture and the device is performing properly. Optionally, the same light show may be distributed to all the hand sized processors and then pushed along the network to other processors. Should any processor fail to perform properly all processors will recognize the failure. If a new processor is added to the network it will connect to the nearest processor, retrieve the light show script, and data on which it should be monitoring.

A global scheduling script application may include a global script created as an image on a central server and then automatically distributed across all controllers (i.e. audio, video or lighting) on the network. The global scripting software may reside on a central computer that recognizes the type of controllers coming online and automatically adds them to the scripting interface so they can be scheduled. Since all controllers monitor each other, only controllers verified as online will be forwarded the global script information. The distribution of the script will be performed in a mesh pattern so as not allow any one controller to interfere in the transfer process. Newly authenticated controllers, as brought online, may simply request the latest global script from the nearest controller and receive both the script and the content from the adjacent device.

Each playback device may be a stand-a-lone unit that does not require any support from any other device to perform its duties. Source content (audio—MP3 files, videos—MPEG2 files, and lighting (show files) may be all stored on the individual player type. A global script (that may or may not consist of scheduling for all types of player content) may be created on a primary software package and then automatically distributed to all players allowing synchronization across the differing content players.

In another application, rather than have devices monitor each other, manufacturers may incorporate a feature called "Watch Dog" that watches for communication through an on board processor. If communication stops the device automatically reboots. After the device comes back on line it will send an email notifying the network administrator or store manager that it rebooted. Optionally, each device may monitor each other and then share its log files (data base) with all other control devices on the network. In this way all controllers know exactly what the other is doing and what processes it should be checking. If a failure is recognized intelligence is incorporated in the software that recognizes that at least one networked controller reported the error therefore none of the others have to do it. This may be helpful to check if a device drops off the network.

In another application, during setup, and then at periodic intervals, a master log from all controllers may be forwarded to a central database. A routine may then be activated that takes the data (data based) and transfers it to all controllers on the system letting them know who they should had been receiving telemetry from and who they should be sending telemetry to. This action may be a double check to make sure every controller on the network is being recognized.

Figure 4:
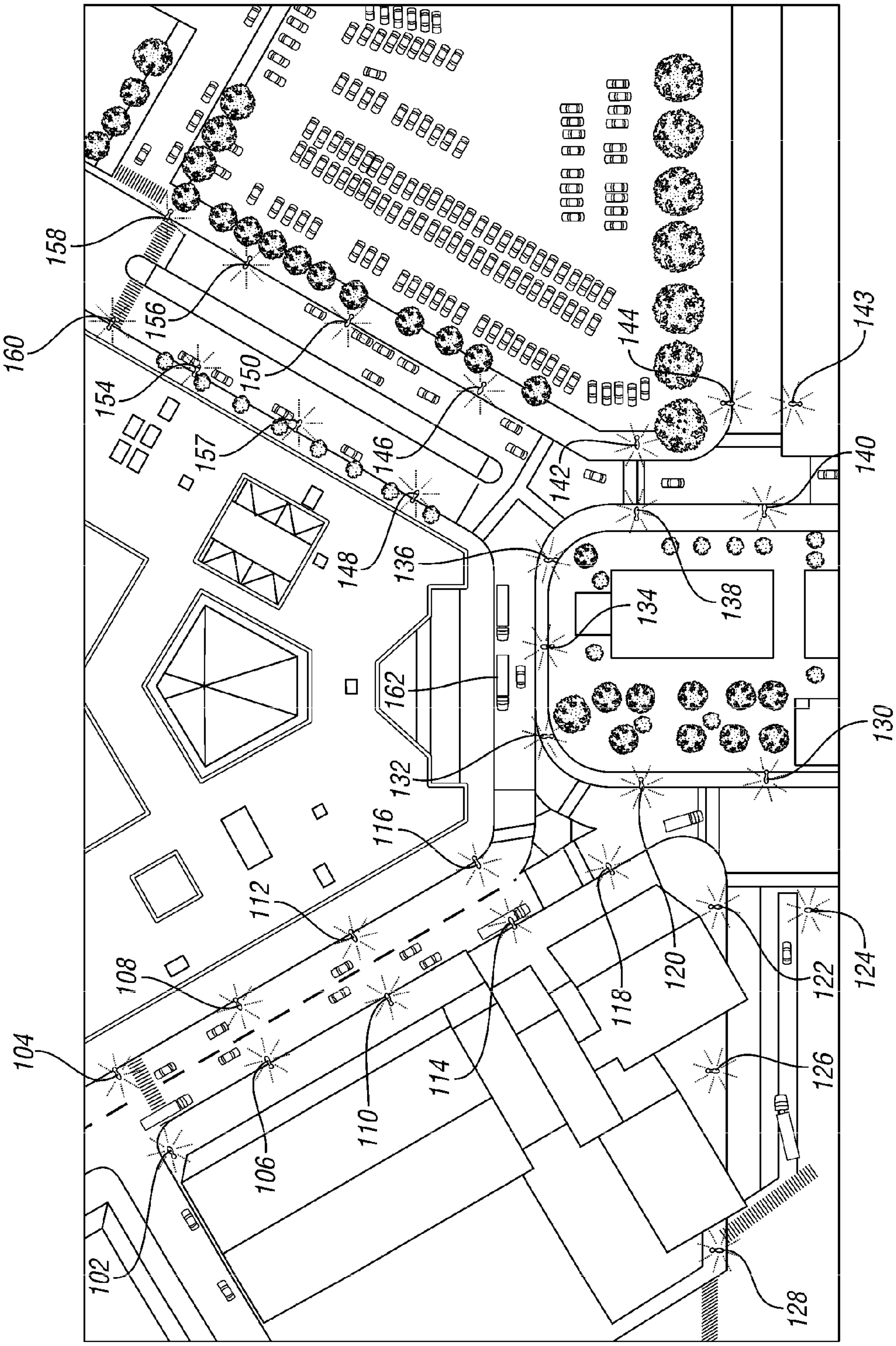
FIG. 4 illustrates a system configured for outputting messages from a number of media devices positioned relative a number of roadways in accordance with one non-limiting aspect of the present invention.

FIG. 4 illustrates a system 100 configured for outputting messages from a number of media devices 102-160 positioned relative a number of roadways in accordance with one non-limiting aspect of the present invention. The media devices 102-160 are shown for exemplary purposes as being configured to output light to surrounding areas depending on one or more sensed conditions (the media devices 102-160 may also be used to output messages and to take other action). The media devices 102-160 contemplated by the present invention and supported above may be configured to sense any number of conditions, such as but not limited to environmental conditions, like moisture, temperature, gas, etc., and non-environmental conditions, such as messages received from other stationary devices, like the other media devices, and transitory devices, like a nearby individual, a controller, a mobile phone/computer, and a moving vehicle (see bus 162).

The system 100 of FIG. 4 is shown with respect to controlling light output from the media devices 102-160 in order to illustrate one exemplary configuration of the present invention supported above where an amount of light output from the media devices 102-160 is controlled according to sensed conditions, such as but not limited to conditions sensed by temperature or water level sensors and/or conditions sensed by antennas or other electronic devices, i.e., receipt of data messages or the like from the other media devices 102-160 or passing vehicles. One action supported by the system is the coordination of light output from the media devices 102-160, including coordination of a uniform light distribution pattern along the roadway where the intensity of light from adjoining light sources is equal. The coordinated action may be done in such a manner that the amount of light output is proportional to the time of day and the time of year. For example, light output may be limited to times of day when sunlight is insufficient and adjustments may be made according to the amount of sunlight available for the corresponding time of year.

The coordinated lighting may also be used to support other operations, such as increased or activated lighting when pedestrians are passing, when busses are unloading passengers, or when light illumination should otherwise change, such as in an emergency where an emergency vehicle may need to change illumination of a traffic light or when the steel lights are illuminated/pulsated to indicate a direction of exit. Likewise, while not illustrated, light poles or other stationary and non-stationary devices having one or more of the media devices 102-160 may include displays and audible outputs for displaying and coordinating any other type of message output to the surrounding area. The desired operation of the media devices 102-160 in response to the sensed condition, whether it relates to changing light output levels or displaying/playing a multimedia message, may be preprogrammed into each of the media devices 102-160 prior to occurrence of the corresponding trigger event, such as through one of the noted wireless operations. Additionally, the media devices 102-160 may be instructed to take action only after occurrence of the triggering event, such as with a master controlling instructing each media device 102-160 to take action after the master controller receives information related to the trigger event, i.e., the master controller can make output decisions for the media output devices based on data received from each media device 102-160, such as through their own sensing operations, and/or from messages received from other sources.

Figure 5:
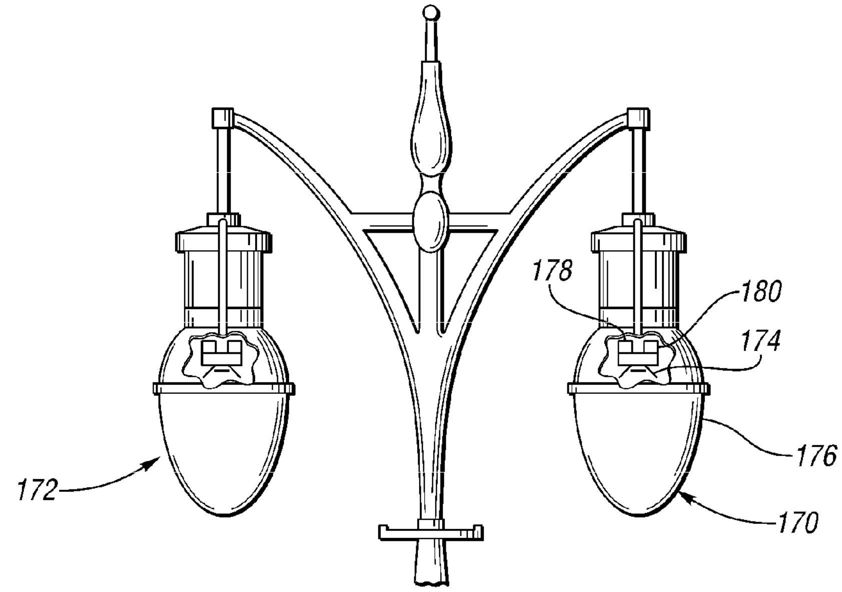
FIG. 5 illustrates an illuminaire in accordance with one non-limiting aspect of the present invention.

As shown in FIG. 5, the media devices 102-160 may include one or more luminaires 170, 172 (see FIG. 3). The luminaires 170, 172 generally refer to a portion of a media device 102-160 having a light source 174 disposed within a housing 177 to direct light out to a surrounding area. The light source 174 may be any type of light source 174, such as an incandescent or a light emitting diode (LED), FIG. 5 illustrates an exemplary configuration where the light source 176 is an LED driven with a driver 178 and controlled with a controller 180. Each luminaire 174, 176 is shown to include a single LED for exemplary purposes but one or more LEDs may be included within each housing depending on the desired light output and the light output capabilities of the each LED. The driver 178 may be configured to provide the LED 176 with a desired amount of current depending on instructions received from the controller 180. The controller 180 may include instructions to instruct the operation of the driver 178 according to locally determined events and/or wireline or wirelessly received instructions sent from a master controller or message transmitting device.

Figure 6:
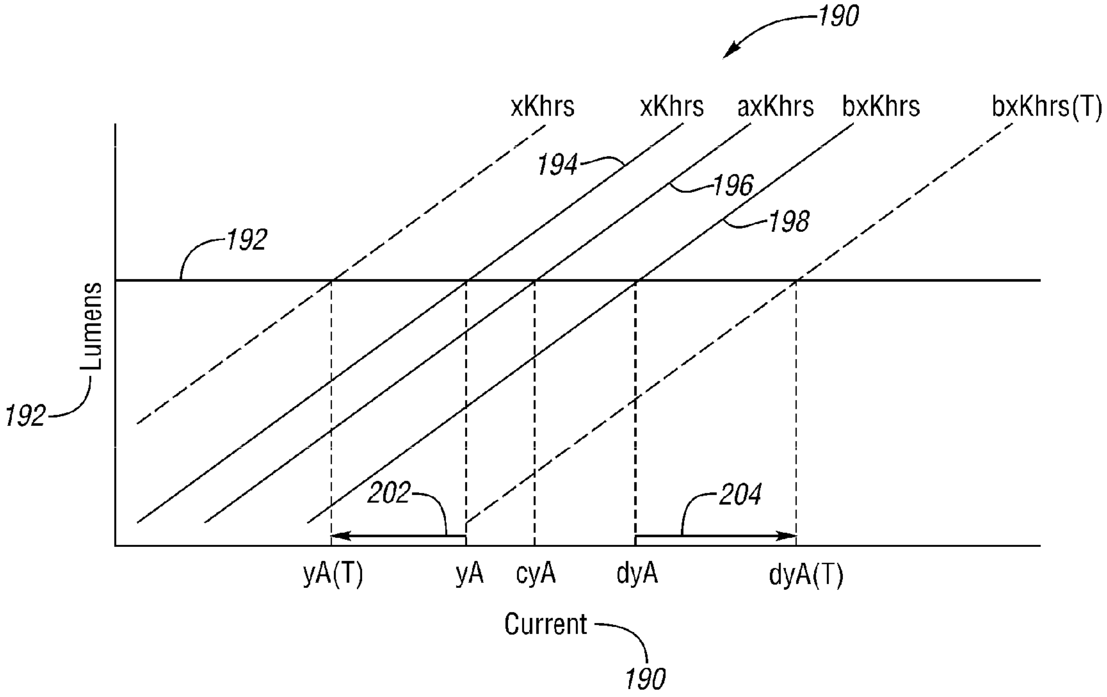
FIG. 6 illustrates an efficacy maximization prediction model that can be used in accordance with one non-limiting aspect of the present invention to predict LED performance over a lifetime.

One issue with the use of LEDs as light sources relates to their extremely long lifespan—some LEDs have a predicted lifetime of 100,000 hours (approximately 11.5 years). Some LEDs are being deployed before their full lifespan can be empirically measured. This lack of actual data can make it difficult to truly understand how different operating characteristics can influence light output and longevity. In the absence of such measured data, the controllers 178 can be configured to rely on predictive lifetime operation characteristic models to predict the lifetime operating changes of the LED 176. These predictions can be used to estimate the amount of current to be provided to the LED 176 in order to achieve a desired amount light output according to the number of hours the LED 176 has been operational. FIG. 6 illustrates an efficacy maximization prediction model 190 that can be used in accordance with one non-limiting aspect of the present invention to predict LED performance over a lifetime.

The efficacy maximization model 190 can be used to initially estimate an amount of current needed to achieve a desired amount of light output (illustrated with the solid horizontal line 192). This exemplary configuration is done without intending to limit the scope and contemplation of the present invention and to demonstrate LED degradation over its lifetime, and particularly, the need to increase supplied current in order to maintain the same light output over time. This relationship is believed to hold true with respect to any desired light output level, i.e., the present invention is not limited to outputting the same amount of light and fully contemplates the use of the efficacy maximization model 190 to select appropriate current values 192 depending on the desired amount of light output 192. This current demand is illustrated with respect to three different periods of time measured by the number of operation hours of an LED, which, for example, may be based on the number of hours the LED has been actively outputting light.

Reference lines 194, 196, 198 for the three different periods are represented with numerical values of ‘x’, ‘a’, and ‘b’ where x is some initial multiple of 1,000 hours of operation and ‘a’ and ‘b’ are additional multiples of ‘x’ with ‘b’ being greater than ‘a’. This nomenclature is generically used as the actual degradation of the LED may vary depending on die construction and other operating variables, such as the amount of current supplied throughout the number of hours of operation, i.e., the LED may tend to degrade faster if larger amounts of current are used when operational. Regardless of the actual time periods represented by the number of hours of operation, the same general pattern of requiring a steady increase in current over time to hold or maintain the same amount of light output may hold true. (The reference lines 194, 196, 198 are shown to be generally linear for this reason but this done for the sake of simplicity—the reference lines need not and may not actually be predicted in the same manner.)

The current increase is illustrated with a similar reference nomenclature as the hours of operation in that the numerical values of ‘y’, ‘c’, and ‘d’ are used to represent the corresponding current values where ‘y’ is some initial multiple of one ampere (A) and ‘c’ and ‘d’ are additional multiples of ‘y’ with ‘d’ being greater than ‘c’. The reference lines 194, 196, 198 can be programmed into the controller of each of the luminaires and/or used by a master controller to direct control of each of the other controllers such that, based on a desired amount of light output, the amount of current needed to provide that amount of light output can be determined according to the number of hours of operation of the particular LED. This process can be used to proved an estimated amount of current to be supplied to the LEDs, and depending on the particular hours of operation and die constructions, different amounts of current may be determined for different LEDs within the system to output the same amount of light, such as in a replacement condition where a new LED is added to an LED coordinate lighting system have already be operation for a period of time (e.g., 1,000 hours, etc.)

The estimation of the current through the use of the three reference lines 194, 196, 198 may be adjusted according to temperature in accordance with one non-limiting aspect of the present invention. The temperature adjustment may be used to effectively adjust the current age of the LED depending on operating and environmental temperatures occurring during the number of hours that the LED has been operational. This may include, for example, each luminaire measuring temperature within the housing 177, temperature outside the housing, i.e., ambient temperature, and junction temperature at the LED die, and/or some combination thereof throughout the hours of operation. This information can then be compiled by the local controller and wirelessly fed back to the master controller and/or simply processed by the local controller for use in adjusting the estimation derived above based on the number of hours of operation.

First and second temperature adjustment lines 202, 204 are shown to illustrate exemplary changes in the first and third reference lines 194, 198 that may occur as a function of an average temperature of the LED throughout its hours of operation. The first temperature adjustment line 202 indicates a need to provide less current than that dictated by the first reference line 194 due the LED operations at lower temperatures. This adjustment may be based on a comparison of the average temperature to a nominal temperature range of the LED used to generate the reference lines 194, 196, 198. The reference lines 194, 196, 198, for example, may be used to predict current demands within a nominal operation range of 15°-35° C., and the adjustment in the direction referenced with arrowed lines 202 may be proportional to a difference between the average temperature range and the lowest value of the nominal operation. A similar relation, but in the opposite direction, is shown with the second temperature adjustment line 204 increasing the age of the LED and in proportion to the amount by which the average temperature is greater than the highest value in the nominal operation range.

The ability of the present invention to adjust the current demand according to LED temperature can be helpful in prolonging the useful lifetime of the LED when the luminaire or other device having the LED is used in a cooler environment than that used to determine the nominal operating temperature range. The temperature adjustments made by the present invention may also be useful in assuring proper light output when the LED is operated in a warmer environment than that specified by the nominal operating range. The capabilities of the present invention are further enhance in that the present invention need not make the temperature adjustment prior to luminaire deployment, i.e., the adjustments can be made by each luminaire after its use in the field. The adjustments to the current demand can be done with the noted temperature sensors and according to the actual readings taken from within the true environment of the LED, as opposed to relying on forecasted temperature or intended use restrictions, which can be helpful in providing a universal luminaire with capabilities to adjust current demands after deployment and operation within an actual environment.

The current demand adjustments provided by the present invention may be implemented as an open or closed loop system in that the actual light output of the light source may or may not be sensed with an included sensor. In some situations it may be beneficial for one or more of the luminaires used in a coordinated lighting system to include an optical sensor that can be used to sense light output to a particular area, such as to assess whether a parking lot or other area is being properly illuminated. The optical sensors can be used to provide feedback for use in coordinate light output of each of the light sources in the system. In some situations, the coordinate light output may be done without reliance on an optical feedback and solely from the values dictated by the efficacy maximization model 190, which may be helpful in limiting costs associated with providing and supporting operations of an optical sensor.

The current demand adjustments provided by the present invention may also be helpful in designing and controlling light patterns and other desired distributions of light output. When illuminating a highway, for example, light sources, such as but not limited to the noted LEDs, may be selected based on the degradation predicted by the efficacy maximization model in that LEDs may be selected that can be driven a lower than capacity current values to provide the required amount of light to the roadway so that as the light source begins to degrade the amount of light output can be increased to maintain the desired level of light output without having to drive the LEDs at its maximum capabilities. In other words, the LEDs can, at least initially, be selected to be of the type that meet the light output demands while at the same time being dimmed with the lower currents, and in some cases lower than nominal currents, so that the lifetime of the LED can be maximized in comparison to the lifetime of an LED that runs closer to its nominal or maximum current ranges from the beginning of its deployment.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours; and wherein the control system adjusts the estimated amount of current by decreasing the estimated amount of current for each LED where the average temperature is less than a predefined threshold.

2. The system of claim 1 further comprising the control system decreasing the estimated amount of current for each LED in proportion to a difference between the average temperature and the predefine threshold.

3. The system of claim 1 wherein the control system adjusts the estimated amount of current by increasing the estimated amount of current for each LED where the average temperature is greater than a predefined threshold.

4. The system of claim 3 further comprising the control system increasing the estimated amount of current for each LED in proportion to a difference between the average temperature and the predefine threshold.

5. The system of claim 1 wherein the desired illumination pattern for the area specifies a uniform amount of light distribution throughout the area such that light output from each LED must be approximately the same.

6. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours; and wherein at least a first portion of the plurality of LEDs are provided with a first amount of current and at least a second portion of the plurality of LEDs are provided with a second, different amount of current in order to provide the uniform amount of light distribution throughout the area.

7. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours; and wherein the desired illumination pattern specifies varying an intensity of the uniform amount of light distribution depending on a time of day and a time of year.

8. The system of claim 1 wherein the plurality of LEDs are included in geographically space apart luminaires, each luminaire including a housing within which the LEDs are positioned to direct light outwardly toward the area.

9. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours;

wherein the plurality of LEDs are included in geographically space apart luminaires, each luminaire including a housing within which the LEDs are positioned to direct light outwardly toward the area; and wherein the average temperature is based on temperature within the housing.

10. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours;

wherein the plurality of LEDs are included in geographically space apart luminaires, each luminaire including a housing within which the LEDs are positioned to direct light outwardly toward the area; and wherein the average temperature is based on temperature outside the housing within an ambient area around the luminaire.

11. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours;

wherein the plurality of LEDs are included in geographically space apart luminaires, each luminaire including a housing within which the LEDs are positioned to direct light outwardly toward the area; and wherein the average temperature is based on temperature at a junction of each LED.

12. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours;

wherein the plurality of LEDs are included in geographically space apart luminaires, each luminaire including a housing within which the LEDs are positioned to direct light outwardly toward the area; and wherein the power system includes a driver within each luminaire to control the current provided to each LED within the same luminaire.

13. The system of claim 12 wherein the control system includes a controller within each luminaire to control the driver within the same luminaire.

14. The system of claim 13 wherein one of the controllers is a master controller that determines the amount of current to be provided to each LED, wherein the master controller wirelessly communicates the determined amount of current to each of the controllers.

15. The system of claim 14 wherein each of the controllers wirelessly communicates temperature values used to adjust the estimated amount of current to the master controller.

16. The system of claim 14 wherein each of the controllers wirelessly communicates hour values used to determine the number of operational hours to the master controller.

17. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours; and wherein the control system determines the amount of current to be provided to each LED without measuring light output of any one of the LEDs.

18. A system for illuminating an area proximate to a plurality of light emitting diodes (LEDs) where an amount of light emitted from the LEDs is proportional to an amount of current used to drive the LEDs, the system comprising:

a power system for powering the plurality of LEDs, the power system being configured to independently control the amount of current provided to each of the LEDs, and thereby, the amount of light emitted from each of the LEDs;

a control system for controlling the power system and the amount of current provided to each of the LEDs according to an efficacy maximization strategy, the efficacy maximization strategy determining the amount of current to be provided to each of the plurality of LEDs in order to provide a desired illumination pattern to the area;

wherein the control system determines the amount of current to be provided to each of the LEDs according to the efficacy maximization strategy by:

i) initially estimating the amount of current for each LED based on a number of operational hours during which that LED has been operational, and thereafter, ii) adjusting the estimated amount of current based on an average temperature of each LED throughout the number of operational hours; and wherein the control system wirelessly communicates with the power system to control the amount of current provided to each LED.

19. A method of controlling a number of LED based light sources to each individually output a constant amount of light when at least a first portion of the light sources rely on LEDs that already have accumulated at least 1,000 or more hours of operation than at least a second portion of the light sources, the method comprising:

driving each LED with an amount of current necessary for each of the LEDs to output the constant amount of light without actually measuring LED light output; and determining the amount of current for each LED to be one of a first amount, a second amount, and a third amount, the first amount being determined solely as a function of a number of hours of operation if an average temperature throughout the number of hour of operation is within a nominal temperature range, the second amount being less than the first amount and determined as a function of the number of hours operation and the average temperature throughout the number of hours of operation if the average temperature is less than the nominal temperature range, and the third amount being greater than the first amount and determined as a function of the number of hours of operation and the average temperature throughout the number of hours of operation if the average temperature is greater than the nominal temperature range.

* * * * *

UNITED STATES PATENT AND TRADEMARK OFFICE

CERTIFICATE OF CORRECTION

PATENT NO. : 8,090,453 B1
APPLICATION NO. : 12/628746
DATED : January 3, 2012
INVENTOR(S) : Ronald Paul Harwood It is certified that error appears in the above-identified patent and that said Letters Patent is hereby corrected as shown below:

Column 13, Line 27, Claim 6:

After “in order to provide” delete “the”.

Column 15, Line 55, Claim 12:

After “to control” delete “the”

Column 14, Line 22, Claim 9:

After “in geographically” delete “space apart” and insert -- spaced apart --.

Column 15, Line 18, Claim 11:

After “in geographically” delete “space apart” and insert -- spaced apart --.

Column 15, Line 51, Claim 12:

After “in geographically” delete “space apart” and insert -- spaced apart --.

Column 17, Line 8, Claim 19:

After “the number of” delete “hour” and insert -- hours --.

Signed and Sealed this
Twenty-seventh Day of March, 2012

David J. Kappos
*Director of the United States Patent and Trademark Office*